US009977823B2

(12) United States Patent
Icho et al.

(10) Patent No.: US 9,977,823 B2

(45) Date of Patent: May 22, 2018

(54) CONTENT CONTROL METHOD, CONTENT CONTROL APPARATUS, AND PROGRAM

(71) Applicant: Panasonic Intellectual Property Corporation of America, Torrance, CA (US)

(72) Inventors: Keiji Icho, Osaka (JP); Ryouichi Kawanishi, Kyoto (JP); Shingo Miyamoto, Hyogo (JP); Kento Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 59 days.

(21) Appl. No.: 14/342,639

(22) PCT Filed: Jul. 3, 2013

(86) PCT No.: PCT/JP2013/004144

§ 371 (c)(1),
(2) Date: Mar. 4, 2014

(87) PCT Pub. No.: WO2014/006903

PCT Pub. Date: Jan. 9, 2014

(65) Prior Publication Data

US 2014/0229485 A1 Aug. 14, 2014

(30) Foreign Application Priority Data

Jul. 6, 2012 (JP) ................................ 2012-152456

(51) Int. Cl.
*G06F 17/30* (2006.01)

(52) U.S. Cl.
CPC .. *G06F 17/30598* (2013.01); *G06F 17/30979* (2013.01)

(58) Field of Classification Search
CPC ......... G06F 17/30598; G06F 17/30979; G06F 17/30994; G06F 17/30041; G06F 17/30053

(Continued)

(56) References Cited

U.S. PATENT DOCUMENTS 7,689,510 B2 * 3/2010 Lamkin ............. G06F 17/30053 709/217
8,046,367 B2 10/2011 Saunders (Continued)

FOREIGN PATENT DOCUMENTS

CN 101558591 10/2009
JP 2004-341940 12/2004

(Continued)

OTHER PUBLICATIONS

International Search Report dated Jul. 30, 2013 in corresponding International Application No. PCT/JP2013/004144.

(Continued)

*Primary Examiner* — Vincent F Boccio
(74) *Attorney, Agent, or Firm* — Wenderoth, Lind & Ponack, L.L.P.

(57) ABSTRACT

A content control method according to the present disclosure includes: obtaining first content file information including attribute information items each on one of first content files which belong to a first content file group; obtaining second content file information including attribute information items each on one of second content files which belong to a second content file group; narrowing down the first content files, the narrowed-down first content files each having an attribute information item satisfying a condition which is set based on the first content file information and the second content file information; and identifying a first content file and a second content file which are partially or entirely same (Continued)

by matching entity information items each on one of the second content files and entity information items each on one or more of the narrowed-down first content files as matching targets.

19 Claims, 9 Drawing Sheets

(58) Field of Classification Search
USPC .................................. 707/707, 758, 766, 737
See application file for complete search history.

(56) References Cited

U.S. PATENT DOCUMENTS

| | | | | |
|---|---|---|---|---|
| 8,458,128 | B2 | 6/2013 | Khosravy et al. | |
| 9,058,329 | B1 * | 6/2015 | Rosenstein | G06F 17/30017 |
| 9,396,195 | B1 * | 7/2016 | Beguelin | G06F 17/30053 |
| 2005/0154680 | A1 * | 7/2005 | Schmelzer | G06F 17/30026 705/67 |
| 2006/0161635 | A1 * | 7/2006 | Lamkin | G06F 17/30041 707/E17.009 |
| 2007/0083558 | A1 * | 4/2007 | Martinez | G06Q 10/10 707/999.107 |
| 2008/0109369 | A1 * | 5/2008 | Su | G06Q 10/06 726/1 |
| 2009/0055387 | A1 | 2/2009 | Saunders | |
| 2009/0144325 | A1 * | 6/2009 | Chastagnol | G06Q 30/06 707/E17.001 |
| 2010/0042682 | A1 * | 2/2010 | Kaye | G11B 27/034 709/203 |
| 2010/0057785 | A1 | 3/2010 | Khosravy et al. | |
| 2012/0117042 | A1 * | 5/2012 | Durante | G06F 17/30053 707/705 |
| 2012/0150870 | A1 * | 6/2012 | Liao | G06F 17/3082 707/748 |
| 2012/0271719 | A1 * | 10/2012 | Straley | G06Q 30/02 705/14.66 |
| 2013/0198132 | A1 | 8/2013 | Khosravy et al. | |

FOREIGN PATENT DOCUMENTS

| | | |
|---|---|---|
| JP | 2006-252143 | 9/2006 |
| JP | 2008-146469 | 6/2008 |
| JP | 2009-134441 | 6/2009 |
| JP | 2010-537324 | 12/2010 |
| JP | 2012-501586 | 1/2012 |
| WO | 2008/058093 | 5/2008 |
| WO | 2009/026398 | 2/2009 |
| WO | 2010/027653 | 3/2010 |

OTHER PUBLICATIONS

Chinese Office Action with Search Report dated Feb. 21, 2017 in Chinese Patent Application No. 201380002846.2 (with partial English translation).

* cited by examiner

FIG. 3

Pre-shared content file information

| File name | Image and video | Pre-shared additional information item |
| --- | --- | --- |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ⋮ | | |

FIG. 4

Shared content file information

| File name | Image and video | Shared additional information item |
| --- | --- | --- |
| ... | ... | ... |
| ... | ... | ... |
| ... | ... | ... |
| ... | ... | ... |
| ... | ... | ... |
| ⋮ | | |

FIG. 9

| Content file ID | Image and video | Pre-shared additional information | Shared additional information |
|---|---|---|---|
| ⋮ | ⋮ | ⋮ | ⋮ |
| ⋮ | ⋮ | ⋮ | ⋮ |

CONTENT CONTROL METHOD, CONTENT CONTROL APPARATUS, AND PROGRAM

TECHNICAL FIELD

The present invention relates to content control methods, content control apparatuses, and programs. More particularly, the present invention relates to a content control method, a content control apparatus, and a program which are capable of identifying a content file based on content file information.

BACKGROUND ART

A spread of mobile terminals and tablet computers, an increase in storage capacity of storage media, and an improvement in network services in recent years have brought users more opportunities to obtain, store, and share content files such as photos and video.

With an increase in the opportunities, several techniques have been proposed in order to manage content file information and data. Patent Literature 1, for example, shows how to facilitate data synchronization between multiple apparatus and a web service.

CITATION LIST

Patent Literature

[PTL 1]

Japanese Unexamined Patent Application Publication (Translation of PCT Application) No. 2012-501586.

SUMMARY OF INVENTION

Technical Problem

The above conventional technique has problems, however. When a user shares some of his or her obtained or stored content files via a social networking service (SNS) and a sharing website, the shared content files and their original content files are different in terms of information on the content files. In other words, the user cannot tell whether or not a shared content file and its original content file are the same content file. In order to identify that these content files are the same one, entity data of both the content files have to be matched. This inevitably increases processing load for information processors such as computers, and thus is not realistically viable.

The present invention is conceived in view of the above problems and aims to provide a content control method, a content control apparatus, and a program which are capable of reducing processing load caused when content files are identified.

Solution to Problem

In order to achieve the above aim, a content control method according to an aspect of the present invention includes: obtaining first content file information including attribute information items each on one of first content files (i) which belong to a first content file group and (ii) each of which have an identifier assigned by a first rule; obtaining second content file information including attribute information items each on one of second content files (i) which belong to a second content file group and (ii) each of which have an identifier assigned by a second rule which is different from the first rule; narrowing down the first content files, the narrowed-down first content files working as matching targets and each having an attribute information item satisfying a condition which is set based on the first content file information and the second content file information; and identifying, respectively from among the narrowed-down first content files and the second content files, a first content file and a second content file which are partially or entirely same by matching entity information items each on one of the second content files and entity information items each on one of the narrowed-down first content files as the matching targets.

It is noted that the overall or specific aspects may be implemented in the form of a system, a method, an integrated circuit, a computer program, or a recording medium such as a computer-readable CD-ROM, or any given combination thereof.

Advantageous Effects of Invention

A content control method, a content control apparatus, and a program according to an implementation of the present invention can reduce processing load caused when content files are identified.

BRIEF DESCRIPTION OF DRAWINGS

FIG. 3 shows exemplary pre-shared content file information according to the embodiment.

FIG. 4 shows exemplary shared content file information according to the embodiment.

FIG. 9 shows exemplary integrated content file information on according to the embodiment.

DESCRIPTION OF EMBODIMENT

Figure 1:
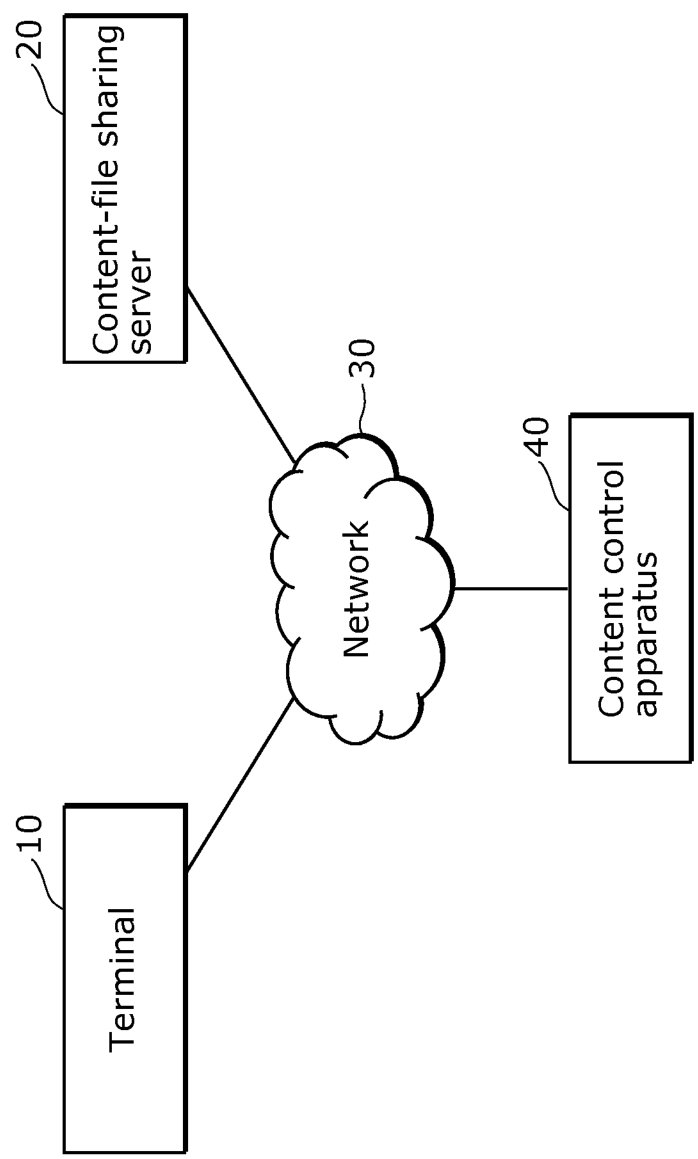
FIG. 1 shows an exemplary system configuration including a content control apparatus according to an embodiment.

[Underlying Knowledge Forming Basis of the Present Invention]

The inventors have thoroughly studied the above-described identification technique of an original content file and its shared content file. In identifying content files, accuracy of the identification could improve by matching entity data or entity information between the content files (hereinafter referred to as content file entity information). Here, the entity information is an amount of characteristic extracted from a content file. The matching of content file entity information, however, causes heavy processing load for information processors such as computers. Hence it is highly difficult and thus realistically impossible to conduct the matching of the content file entity information between all the pre-shared content files and shared content files in terms of a capability of and a processing time for the information processors.

An implementation of the present invention is conceived in view of the above problems and aims to provide a content control method which is capable of reducing processing load caused when content files are identified In order to achieve the above aim, a content control method according to an aspect of the present invention includes: obtaining first content file information including attribute information items each on one of first content files (i) which belong to a first content file group and (ii) each of which have an identifier assigned by a first rule; obtaining second content file information including attribute information items each on one of second content files (i) which belong to a second content file group and (ii) each of which have an identifier assigned by a second rule which is different from the first rule; narrowing down the first content files, the narrowed-down first content files working as matching targets and each having an attribute information item satisfying a condition which is set based on the first content file information and the second content file information; and identifying, respectively from among the narrowed-down first content files and the second content files, a first content file and a second content file which are partially or entirely same by matching entity information items each on one of the second content files and entity information items each on one of the narrowed-down first content files as the matching targets.

The above features can implement a control technique to reduce processing load caused when content files are identified. More specifically, instead of matching content file entity information items between all the first content files and all the second content files, the features narrow down the range of target first content files for the matching of the content file entity information items, using attribute information items (meta data, for example) on the first content files and the second content files prior to the matching for the content file entity information items. Such features make it possible to identify content files with realistic processing load and processing time, which contributes to reducing processing load when content file are identified.

Furthermore, for example, the content control method may include associatively consolidating a first content file information item included in the first content file information and a second content file information item included in the second content file information with each other, the first content file information item and the second content file information item being respectively on the first content file and the second content file identified in the identifying as partially or entirely same.

Such a feature makes it possible to consolidate a first content file and a second content file associatively with each other. Here, the first content file and the second content file are identified equal. In the case where content files are dispersively found such that the first content files are found in one or more terminals and the second content files are found in one or more sharing websites, the above feature makes it possible to associatively consolidate possibly-equal content files with each other.

For example, the second content file group may include a first content file (i) included in one or more of the first content files belonging to the first content file group and (ii) stored as one of the second content files, and the first content file stored as the one second content file may have the identifier assigned by the second rule instead of the identifier assigned by the first rule.

Such features make it possible to narrow down target first content files for the matching, using attribute information items on the first content files and the second content files. Consequently, the features allow the matching between the entity information items on the second content files and the entity information items on the narrowed-down first content files, which contributes to efficient and accurate identification of content files.

For example, the second content file group may include a first content file (i) included in one or more of the first content files belonging to the first content file group and (ii) shared as one of the second content files, and, in the second content file group, the first content file shared as the one second content file may be managed with the identifier assigned by the second rule instead of the identifier assigned by the first rule.

Such features make it possible to narrow down the range of target first content files for matching, using attribute information items on content files before and after sharing; namely, the first and second content files. Consequently, the features allow the matching between the entity information items on the second content files and the entity information items on the narrowed-down first content files, which contributes to efficient and accurate identification of content files.

For example, the second content file group may be managed on a content-file managing website. The content control method may further include specifying, from among the attribute information items included in the first content file information, an attribute information item to be used for the narrowing down, the specifying being based on a content-file managing scheme specified on and obtained from the content-file managing website. The narrowing down may include the setting of the condition based on the first content file information, the second content file information, and the attribute information item specified in the specifying.

Such features make it possible to appropriately set a condition for narrowing down the first content files to obtain target first content files for matching based on the specified attribute information items and the attribute information items on content files before and after sharing; namely, the first and second content files, as well as to specify attribute information items to be used for the narrowing down based on the content-file managing scheme specified on the managing website.

The first content files and the second content files may be one of image, video, audio, and music.

For example, the attribute information items in the first content file information include at least one of: information on dates and times when the first content files were obtained or stored; information on places where the first content files were obtained or stored; information on terminals by or in which the first content files were obtained or stored; information on sizes of the first content files; information on tags of the first content files; information on applications used when the first content files were shared; and information on file formats of the first content files.

Such features make it possible to obtain narrowed-down target first content files for matching, using the attribute information items each including at least one of: information on dates and times when the first content files were obtained or stored; information on places where the first content files were obtained or stored; information on terminals by or in which the first content files were obtained or stored; information on tags of the first content files; information on applications used when the first content files were shared; and information on file formats of the first content files.

For example, the attribute information items in the second content file information include at least one of: information on dates and times when the second content files were obtained or stored, or when the second content files belonged to the second content file group; information on places including places where the second content files were stored; information on terminals by or in which the second content files were obtained or stored, or which caused the second content files to belong to the second content file group; information on sizes of the second content files; information on tags of the second content files; information on applications used when the second content files belonged to the second content file group; and information on file formats of the second content files.

Such features make it possible to obtain narrowed-down target first content files for matching, using the attribute information items each including at least one of: information on dates and times; information on places; information on terminals in which the second content files were stored; information on sizes of the second content files; information on tags of the second content files; information on applications which were used; and information on file formats of the second content files.

For example, the first content files may include images, and each of the attribute information items in the first content file information includes one of: information on a size and an aspect ratio of each of the images in the first content files; and information on a ratio of a resolution for each of the images in the first content files.

When the first content files are images, the features make it possible to obtain target narrowed-down first content files for matching, using information either on a size and a playing time of each of the images or on a ratio of a resolution (image size) for each of the images.

For example, the second content files include images, and each of the attribute information items in the second content file information includes one of: information on a size and an aspect ratio of each of the images in the second content files; and information on a ratio of a resolution for each of the images in the second content files.

For example, each of the attribute information items in the second content file information includes: (i) one of a comment, an evaluation, and a tag assigned to each of the second content files by a user, or (ii) information indicating a result of a text analysis on the comment, the evaluation, or the tag.

Thanks to such features, the attribute information items included in the second content file information can be either (i) one of a comment, an evaluation, and a tag assigned to each of the second content files by the user, or (ii) information indicating the result of a text analysis on information on the comment, the evaluation, and the tag. Thus, the features make it possible to narrow down target first content files for matching, using at least one of information items in the attribute information items.

In order to achieve the above aim, a content control apparatus according to an implementation of the present invention includes: a first content file information obtaining unit which obtains first content file information including attribute information items each on one of first content files (i) which belong to a first content file group and (ii) each of which have an identifier assigned by a first rule; a second content file information obtaining unit which obtains second content file information including attribute information items each on one of second content files (i) which belong to a second content file group and (ii) each of which have an identifier assigned by a second rule which is different from the first rule; a narrowing unit which narrows down the first content files, the narrowed-down first content files working as matching targets and each having an attribute information item satisfying a condition which is set based on the first content file information and the second content file information; and a content file identifying unit which identifies, respectively from among the narrowed-down first content files and the second content files, a first content file and a second content file which are partially or entirely same by matching entity information items each on one of the second content files and entity information items each on one of the narrowed-down first content files as the matching targets.

It is noted that the overall and specific aspects may be implemented in the form of a system, a method, an integrated circuit, a computer program, or a recording medium such as a computer-readable CD-ROM, or any given combination thereof.

Described hereinafter are a content control method and a content control apparatus according to an embodiment of the present invention, with reference to the drawings.

It is noted that any of the embodiment below is a specific example of the present invention. The numerical values, shapes, materials, constituent elements, arrangement positions of and connecting schemes between the constituent elements, steps, and an order of steps all described in the embodiment are examples, and shall not be defined as they are. Hence, among the constituent elements in the embodiment, those not described in an independent claim representing the most generic concept of the present invention are introduced as arbitrary constituent elements.

Embodiment

Described hereinafter is an embodiment of the present invention, with reference to the drawings.

FIG. 1 shows an exemplary system configuration including a content control apparatus according to the embodiment. As shown in FIG. 1, a content control apparatus 40 is connected with a terminal 10 and a content-file sharing server 20 via a network 30. The content control apparatus 40 identifies the same content files from among (i) content files which are stored in the terminal 10 and not shared (exemplary first content files, and hereinafter referred to as pre-shared content file) and (ii) content files which are stored in the content-file sharing server 20 and shared (exemplary second content files, and hereinafter referred to as shared content file). The content control apparatus 40 then associates the identified same content files with each other. The content control apparatus 40 may be a typical computer.

The terminal 10 includes, for example, a digital camera, a cellular phone, a tablet computer, a home server and a TV for storing content files. The content-file sharing server 20 includes, for example, a server for providing an SNS and a sharing website.

The exemplary system configuration in FIG. 1 shows one terminal 10 and one content-file sharing server 20; however, the system configuration shall not be defined as it is. The system configuration may include multiple terminals 10 and content-file sharing servers 20.

Figure 2:
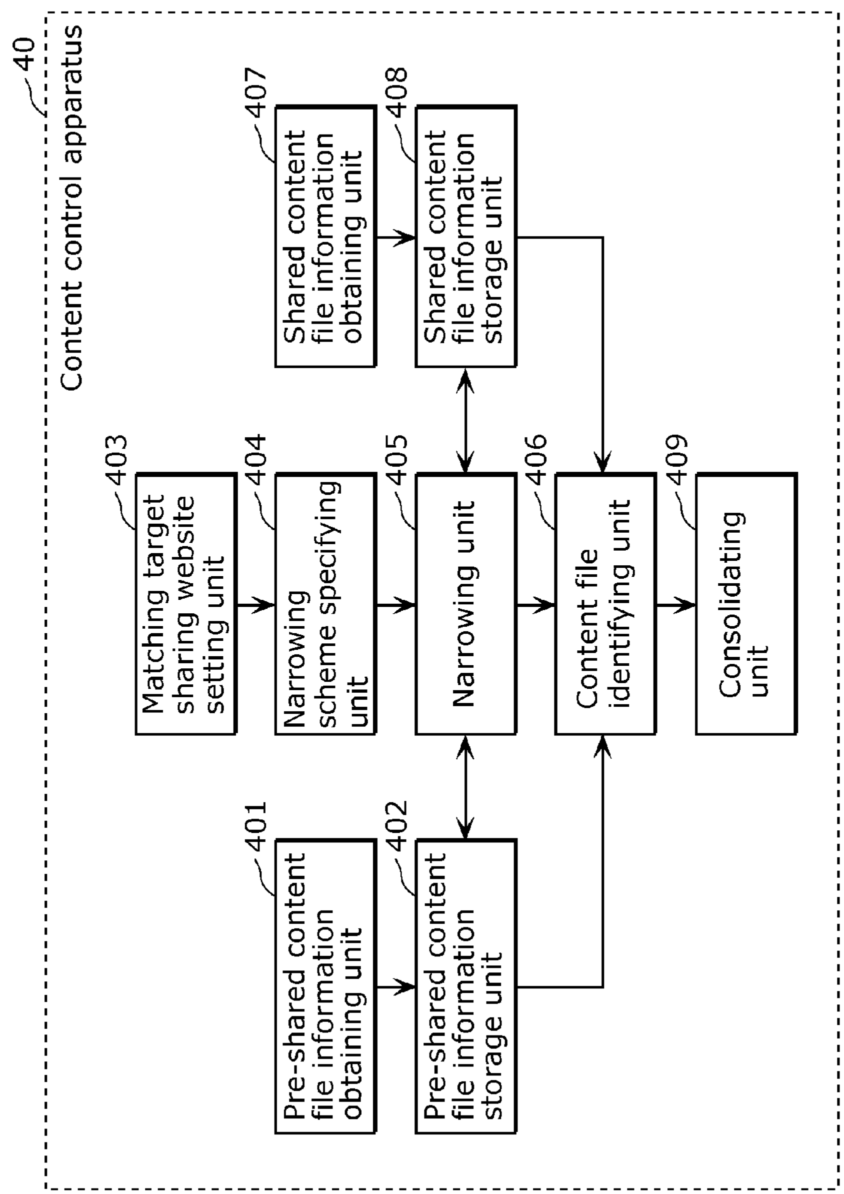
FIG. 2 shows exemplary functional blocks included in the content control apparatus according to the embodiment.

FIG. 2 shows exemplary functional blocks included in the content control apparatus according to the embodiment.

As shown in FIG. 2, the content control apparatus 40 includes a pre-shared content file information obtaining unit 401, a pre-shared content file information storing unit 402, a matching target sharing website setting unit 403, a narrowing scheme specifying unit 404, a narrowing unit 405, a content file identifying unit 406, a shared content file information obtaining unit 407, a shared content file information storing unit 408, and a consolidating unit 409.

As an exemplary first content file information obtaining unit, the pre-shared content file information obtaining unit 401 obtains first content file information including attribute information items each on one of multiple first content files. The first content files belong to a first content file group and each have an identifier assigned by a first rule. In the embodiment, the pre-shared content file information obtaining unit 401 obtains information items (hereinafter referred to as pre-shared content file information), on generated and stored pre-shared content files, before the pre-shared content files are shared on a sharing website. Here, the first content file group is a group of content files stored in the terminal 10. Each of the content files has an identifier for uniquely identifying a content file, and the identifier is a file name and an ID assigned by the terminal 10 and an application of the terminal 10 according to a certain rule (first rule). The pre-shared content files are exemplary first content files. The pre-shared content file information is exemplary first content file information, and includes various kinds of information on a pre-shared content file. More specifically, the pre-shared content file information includes, for example, an attribute information item such as a file format, and meta-information and tag information assigned to a pre-shared content file while the pre-shared content file is being obtained or after the pre-shared content file is obtained, as well as the file name and the entity data (such as image, video, audio) of the pre-shared content file. It is noted that the attribute information item is assigned to the data file of the pre-shared content file, for example.

The pre-shared content file information storing unit 402 stores the pre-shared content file information obtained by the pre-shared content file information obtaining unit 401.

As an exemplary second content file information obtaining unit, the shared content file information obtaining unit 407 obtains second content file information including attribute information items each on one of multiple second content files. The second content files belong to a second content file group, and each have an identifier assigned by a second rule which is different from the first rule. In the embodiment, the shared content file information obtaining unit 407 obtains information items (hereinafter referred to as shared content file information) on shared content files which have been uploaded and shared on the sharing website from among the generated and stored pre-shared content files. Here, the second content file group is a group of content files managed by an SNS run by the content-file sharing server 20. Each of the content files has an identifier for uniquely identifying a content file. The identifier is a file name and an ID assigned according to a certain rule (second rule, which is different from the first rule) assigned by the SNS managed by the content-file sharing server 20. The shared content files are exemplary second content files. The shared content file information is exemplary second content file information, and includes various kinds of information on a content file. More specifically, the shared content file information includes, for example, an attribute information item such as meta-information and tag information indicating a file format, as well as the file name and the entity data (such as image, video, audio) of the shared content file. In addition, the attribute information item may include one of (i) comment information and evaluation information assigned by the user to a shared content file when and after the shared content file is shared and (ii) information obtained through a text analysis. The attribute information item may be assigned to a data file of a shared-content file as attribute information and tag information.

The shared content file information obtaining unit 407 may also obtain sharing website identification information for identifying a sharing website managed by the content-file sharing server 20.

The shared content file information storing unit 408 stores the shared content file information obtained by the shared content file information obtaining unit 407.

The matching target sharing website setting unit 403 sets a sharing website for matching targets. The sharing website for matching targets shares a shared content file which is a target for matching with a pre-shared content. The sharing website may be set either with or without a user input. With the user input, the matching target sharing website setting unit 403 displays a list of sharing websites on the terminal 10 of the user, and receives a selection input from the user. Without the user input, the matching target sharing website setting unit 403 may, for example, obtain the sharing website identification information obtained by the shared content file information obtaining unit 407, and set a sharing website which is identifiable by the obtained sharing website identification information.

The narrowing scheme specifying unit 404 specifies a narrowing scheme (primary matching scheme), depending on the sharing website set by the matching target sharing website setting unit 403. Exemplary narrowing schemes include "the date when the pre-shared content file was obtained or stored is on or before the shared content was shared", and "the pre-shared content file and the shared content file are the same in file size if the file size of the shared content file is smaller than the maximum size for sharing specified for the sharing website, and the file size of the pre-shared content file is greater than or equal to the maximum size for sharing if the file size of the shared content file is of the maximum size for sharing specified for the sharing website".

The narrowing scheme specifying unit 404 manages, for example, rule information on a narrowing scheme specified for each sharing website. With reference to the rule information, the narrowing scheme specifying unit 404 identifies to specify a narrowing scheme for a sharing website set by the matching target sharing website setting unit 403. It is noted that one or more narrowing schemes may be identified in the above techniques.

Based on the narrowing scheme (primary matching scheme) specified by the narrowing scheme specifying unit 404, the narrowing unit 405 matches (i) an attribute information item included in a pre-shared content file information stored in the pre-shared content file information storing unit 402 and (ii) an attribute information item included in a shared content file information stored in the shared content file information storing unit 408 (primary matching), and narrows down targets whose content file entity information items are subject to matching (secondary matching). Here, the former attribute information item is included in the pre-shared content file information (such as image, video, audio, and music) and is other than the content file entity information item.

For example, when the narrowing scheme specifying unit 404 specifies "the date when the pre-shared content file was obtained or stored is on or before the shared content was shared", the narrowing unit 405 sequentially executes the operations below on each of the shared content files stored in the shared content file information storing unit 408. The narrowing unit 405 first refers to sharing time and date included in the shared content file information. Next, the narrowing unit 405 narrows down pre-shared content files and identifies, as secondary matching targets, narrowed down pre-shared content file whose times and dates of obtainment and storage included in the pre-shared content file information are on or before the times of sharing for target shared content files. Here, the pre-shared content file information is referred by the pre-shared content file information storing unit 402.

In addition, when the narrowing scheme specifying unit 404 specifies as a narrowing scheme "the pre-shared content file and the shared content file are the same in file size if the file size of the shared content file is smaller than the maximum size for sharing specified for the sharing website, and the file size of the pre-shared content file is greater than or equal to the maximum size for sharing if the file size of the shared content file is of the maximum size for sharing specified for the sharing website", for example, the narrowing unit 405 executes the operations below on each of the shared content files stored in the shared content file information storing unit 408. The narrowing unit 405 first refers to file size included in the shared content file information. If the file sizes of target shared content files are smaller than the maximum size for sharing specified for the sharing website, the narrowing unit 405 narrows down pre-shared content files and identifies, as secondary matching targets, narrowed down pre-shared content files whose file sizes included in the pre-shared content file information are equal to the file size of the target shared content files. Here, the pre-shared content file information is referred by the pre-shared content file information storing unit 402. In contrast, if the file size of a target shared content file is the maximum size for sharing specified for the sharing website, the narrowing unit 405 narrows down pre-shared content files and identifies, as secondary matching targets, narrowed down pre-shared content files whose file sizes included in the pre-shared content file information are greater than or equal to the maximum size for sharing. Here, the pre-shared content file information is referred by the pre-shared content file information storing unit 402.

The content file identifying unit 406 identifies a first content file and a second content file which are partially or entirely the same by matching entity information items each on one of multiple second content files and entity information items each on one of the narrowed-down first content files as the matching targets.

In the embodiment, the content file identifying unit 406 identifies a content file by matching entity data between shared content files and pre-shared content tiles narrowed down by the narrowing unit 405.

Specifically, the content file identifying unit 406 identifies a content file and another content file which are partially or same by matching (secondary matching) content file entity information items between shared content files and pre-shared content files which are narrowed down by the narrowing unit 405. For example, the content file identifying unit 406 sequentially executes operations below on each of shared content files stored in the shared content file information storing unit 408. The content file identifying unit 406 first refers to content file entity information items included in the shared content file information. Then, the content file identifying unit 406 matches (i) the content file entity information items on target shared content files and (ii) the content file entity information items in the pre-shared content file information and only on the pre-shared content files that are narrowed down by the narrowing unit 405. Here, the pre-shared content file information is stored in the pre-shared content file information storing unit 402. Then, the content file identifying unit 406 identifies.

Here, as described above, the content file entity information item is an amount of characteristics extracted from a content file or the entity data item of the content file. The matching content file entity information items include a comparison between entity data items of content files and between the amounts of characteristics extracted from content files. When content files are images, for example, matching content file entity information items involves either a comparison of color information and luminance between pixels forming the images or a comparison between the amounts of characteristics extracted from objects (person or thing) included in the images. When content files are audio files and music files, matching content file entity information items involves such comparisons as ones between (i) frequencies of files such as audio files and music files, (ii) amplitudes of files such as audio files and music files, and (iii) amounts of characteristics extracted from the components of the audio and the music.

The consolidating unit 409 associatively consolidates a first content file information item included in the first content file information and a second content file information item included in the second content file information with each other. Here the first content file information item and the second content file information item are respectively on a first content file and a second content file which are identified equal.

In the embodiment, the consolidating unit 409 associatively consolidates a pre-shared content file information item and a shared content file information item identified by the content file identifying unit 406.

FIG. 3 shows exemplary pre-shared content file information stored in the pre-shared content file information storing unit 402 according to the embodiment. In the example in FIG. 3, file names, entity data items (in the column "Image and Video") of pre-shared content files, and pre-shared additional information items for pre-shared content files are managed associatively with one another as the pre-shared content file information. A pre-shared additional information item includes information for identifying the kind of a pre-shared content file (such as image video, and audio), the extension of a file, the file size, information on the date and time when the pre-shared content file is obtained and stored, information on the place where the pre-shared content file is obtained and stored, information on the appliance by which the pre-shared content file is obtained and stored, information on the application with which the pre-shared content file was shared, information for identifying a sharing website on which the pre-shared content file was shared, information on a subject, information on the event and the scene in which the subject is captured, information on the aspect ratio of the image size, and information on the resolution. It is noted that the pre-shared additional information item can be manually or automatically assigned at any give time when or after obtaining the image. In addition, the pre-shared additional information item does not have to include all of the information above, and may include part of the above information. The example in FIG. 3 shows that file names and pre-shared additional information items correspond to attribute information items, and entity data items (the column "Image and Video") correspond to entity information items.

FIG. 4 shows exemplary shared content file information stored in the shared content file information storing unit 408 according to the embodiment. In the example in FIG. 4, file names, entity data items (in the column "image and video") of shared content files, and shared additional information items for pre-shared content files are managed associatively with one another as the shared content file information. A shared additional information item includes information for identifying the kind of shared content file (such as image video, and audio), the extension of a file, the file size, information on the date and time when the shared content file is shared, information on a comment and an evaluation assigned to the shared content file by the user when and after the shared content file was shared, and information obtained thorough text analysis of the information on a comment and an evaluation. It is noted that the shared additional information item can be assigned manually or automatically at any given time when or after obtaining the sharing. In addition, the shared additional information item does not have to include all of the information above, and may include part of the above information. The example in FIG. 4 shows that file names and shared additional information items correspond to attribute information items, and entity data items (the column "Image and Video") correspond to entity information items.

It is noted that the pre-shared additional information item may be partially or entirely deleted by the terminal 10 or the content-file sharing server 20 in sharing content files.

The pre-shared additional information item may be partially or entirely changed to a more coarse information item by the terminal 10 or the content-file sharing server 20 in content file sharing. For example, (i) on the data and time of the capture and storage, the attribute information item for a pre-shared content file including by up to seconds may be changed to indicate the date and time by minutes for a shared content file, and (ii) on the place of the capture and storage, the attribute information item for a pre-shared content file including by up to seconds in latitude and longitude may be changed to indicate the place by minutes in latitude and longitude for a shared content file. In addition, (iii) for information on an appliance to capture and store a content file, the attribute information item for a pre-shared content file on the product number and model number of the appliance may be changed to include the kind of the appliance for a shared content file. Furthermore, (iv) for an application used when a pre-shared content file is shared, the attribute information item for a pre-shared content file on up to the name of the application may be changed to include only the kind of the application for a shared content file.

The shared content file information storing unit 408 then includes the above-changed attribute information item in a shared additional information item and stores the shared additional information item.

As described above, in the content-file sharing server 20, the pre-shared content file to be shared as a shared content file has an identifier assigned by the second rule instead of the identifier assigned to by the first rule. In the content-file sharing server 20, in other words, the identifier of the pre-shared content file is changed to indicate a different file name from the file name that has been assigned to the pre-shared content file, and the changed identifier is assigned to the shared content file so that the shared content file is uniquely identifiable. It is noted that the content file per se may be changed by the terminal 10 or the content-file sharing server 20 in content file sharing. For example, (i) the file size of a shared content file may be changed for storage (management) so that the changed file size is smaller than or equal to the maximum permissible size specified by a sharing website managed by the content-file sharing server 20. Furthermore, (ii) when the pre-shared content file is an image, the aspect ratio of the image for the shared content file may be changed for storage (management) so that the horizontal to vertical ratio fits the one specified by the sharing website.

Then, as part of the shared content file information, the shared content file information storing unit 408 stores (includes) only the changed information or stores (includes) the information before change and the information after change associatively with each other.

The content control apparatus 40 structured above can implement a control technique to reduce processing load caused when content files are identified. More specifically, instead of matching content file entity information items between all the pre-shared content files and all the shared content files, the content control apparatus 40 narrows down (primary matching) the range of target pre-shared content files for the matching of the content file entity information items using attribute information items (meta data, for example) on the pre-shared content files and the shared content files, prior to the matching for the content file entity information items (secondary matching). Such features make it possible to identify content files with realistic processing load and processing time, which contributes to reducing processing load when content file are identified.

Figure 5:
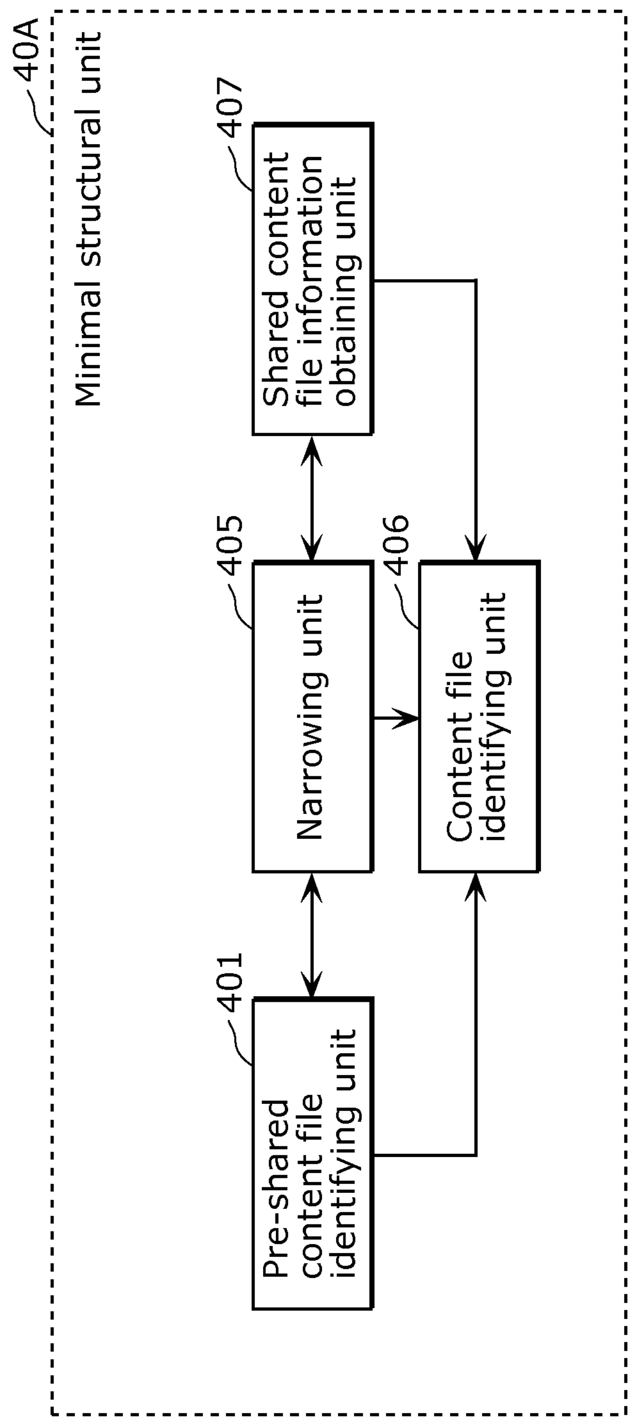
FIG. 5 shows exemplary functional blocks included in a minimal structural unit according to the embodiment.

As described above, the content control apparatus 40 includes the pre-shared content file information obtaining unit 401, the pre-shared content file information storing unit 402, the matching target sharing website setting unit 403, the narrowing scheme specifying unit 404, the narrowing unit 405, the content file identifying unit 406, the shared content file information obtaining unit 407, the shared content file information storing unit 408, and the consolidating unit 409. As shown in FIG. 5, a minimal structural unit 40A may be provided as the minimal structure of the content control apparatus 40. In other words, the minimal structural unit 40A may include the pre-shared content file information obtaining unit 401, the narrowing unit 405, the content file identifying unit 406, and the shared content file information obtaining unit 407. The minimal structural unit 40A may at least narrow down (primary matching) the range of target pre-shared content files for the matching of content entity information items using attribute information items (meta data, for example) on the pre-shared content files and the shared content files, prior to the matching for the content file entity information items.

Described next is an operation of the above-structured content control apparatus according to the embodiment.

Figure 6:
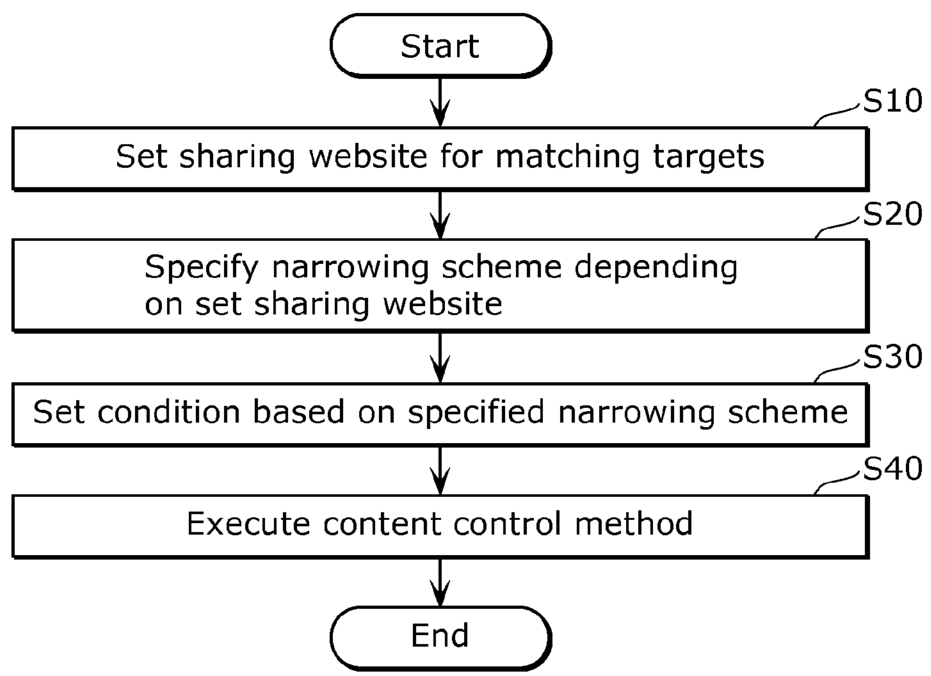
FIG. 6 depicts a flowchart showing an exemplary operation of the content control apparatus according to the embodiment.

FIG. 6 depicts a flowchart showing an exemplary operation of the content control apparatus according to the embodiment.

Figure 7:
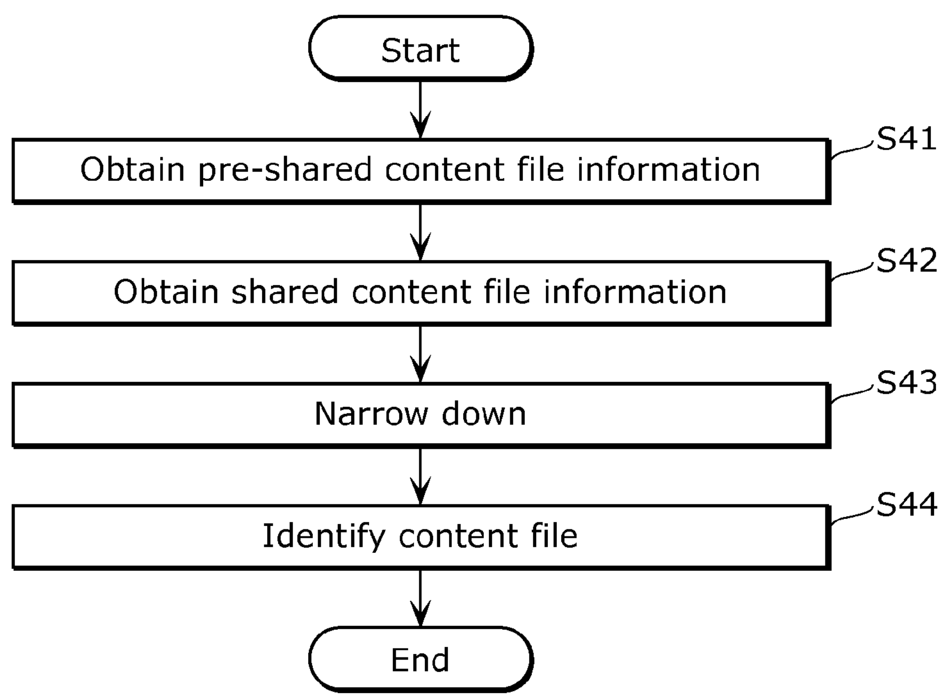
FIG. 7 depicts a flowchart showing an exemplary characteristic operation of the content control apparatus according to the embodiment.

FIG. 7 depicts a flowchart showing an exemplary characteristic operation of the content control apparatus according to the embodiment.

The matching target sharing website setting unit 403 first sets a sharing website for matching targets from among sharing websites managed by the content-file sharing server 20 (S10). Here, the sharing website for matching target is set either by a user input or a technique other than the user input.

Next, the narrowing scheme specifying unit 404 specifies a narrowing scheme (primary matching scheme) depending on the sharing website set by the matching target sharing website setting unit 403 (S20). A specific example of the narrowing scheme (primary matching scheme) has been described above, and the details there of shall be omitted here.

Then, based on the narrowing scheme specified by the narrowing scheme specifying unit 404, the narrowing unit 405 sets a condition for narrowing target pre-shared content files for the secondary matching. Here, the narrowing unit 405 has the condition specified based on the details of each of the items of attribute information items included in the pre-shared content file information obtained by the pre-shared content file information obtaining unit 401 and the shared content file information obtained by the shared content file information obtaining unit 407.

Next, the content control apparatus 40 executes a content control method which is a characteristic operation according to the embodiment (540).

As specifically shown in FIG. 7, the pre-shared content file information obtaining unit 401 first obtains pre-shared content file information including attribute information items each on one of the pre-shared content files (541). Here, the pre-shared content files are held in the terminal 10 and each having an identifier (such as a file name and an ID) assigned by the first rule.

Next, the shared content file information storing unit 408 obtains shared content file information including attribute information items each on one of the shared content files (S42). Here, the shared content files are managed by the content-file sharing server 20 and each having an identifier assigned by the second rule that differs from the first rule.

Then, the narrowing unit 405 narrows down the pre-shared content files. The narrowed-down pre-shared content files work as matching targets (secondary matching target), and each of the narrowed down pre-shared content files has an attribute information item satisfying a condition which is set based on the pre-shared content file information and the shared content file information (S43).

Next, the content file identifying unit 406 identifies, respectively from among the narrowed-down pre-shared content files and the shared content files, a pre-shared content file and a shared content file which are partially or entirely the same by matching (secondary matching) content file entity information items each on one of the shared content files and content file entity information items each on one of the narrowed-down pre-shared content files as matching targets.

Hence, the content control apparatus 40 matches content file entity information items for shared content files and content file entity information items for pre-shared content files narrowed down (fit in a specific range) by the narrowing unit 405, and identifies content files which are partially or same.

Then, the content control apparatus 40 may hold the result of the content file identification as, for example, consolidated information. More specifically, the consolidating unit 409 associatively consolidates a pre-shared content file information item and a shared content file information item identified by the content file identifying unit 406.

Figure 8:
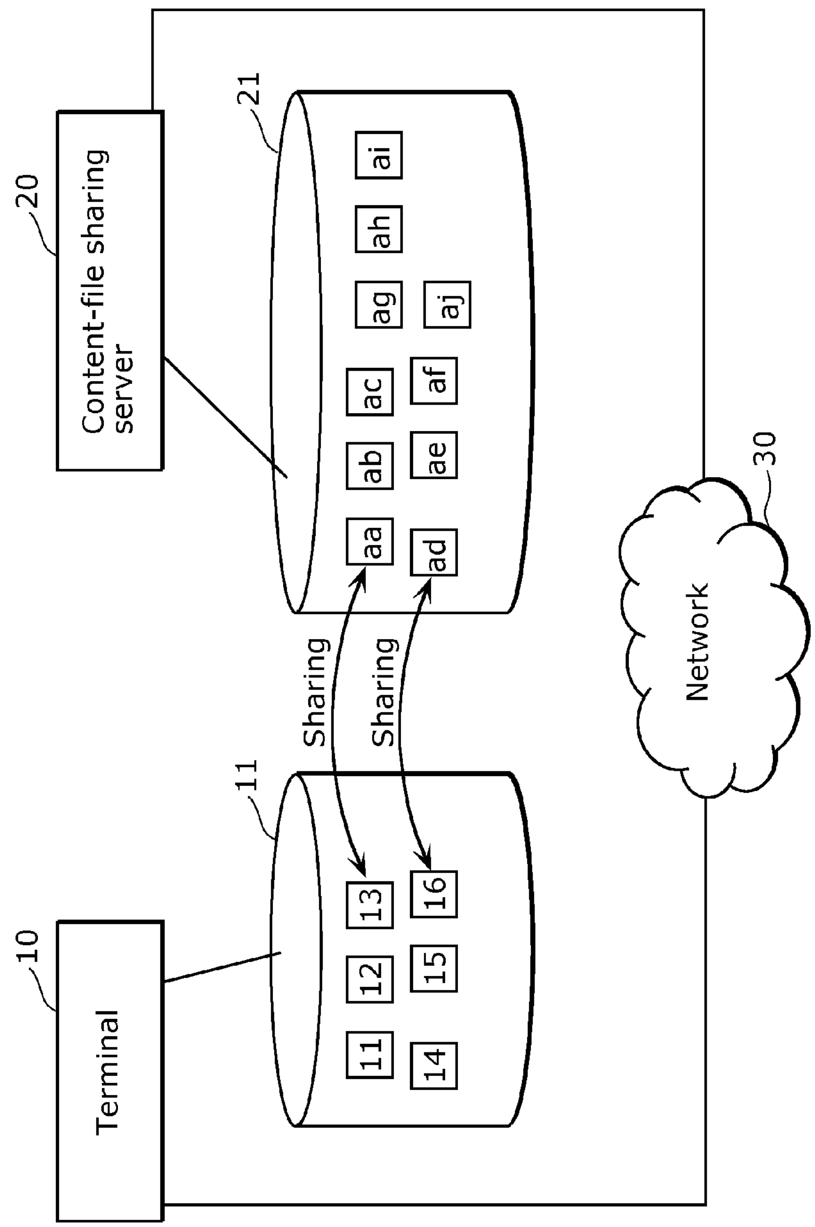
FIG. 8 shows how a content control method according to the embodiment works.

Here, described with reference to FIG. 8 is an effect of the content control apparatus 40, FIG. 8 shows how a content control method according to the embodiment works.

FIG. 8 shows pre-shared content files 11 to 16 stored in a storage unit 11 included in the terminal 10, and shared content files aa to aj managed (shared) in a storage unit 21 included in the content-file sharing server 20. In other words, the terminal 10 stores the pre-shared content files 11 to 16 each having an identifier (ID in FIG. 8) assigned by the first rule, and the content-file sharing server 20 shares the shared content files aa to aj each having an identifier (ID in FIG. 8) assigned by the second rule that differs from the first rule.

The content-file sharing server 20 shares, as the shared content files aa and ad, the pre-shared content files 13 and 16 stored in the terminal 10. Here, a conventional technique cannot tell whether or not the shared content file aa and the pre-shared content file 13 are originally the same and the shared content file ad and the pre-shared content files 16 are originally the same. This is because the identification of the shared content files aa and ad respectively with the pre-shared content files 13 and 16 as the same content files causes heavy processing load, and the processing for the identification is not realistically viable.

In comparison, the content control method according to the present embodiment involves, prior to matching content file entity information items, narrowing down the range of target pre-shared content files for matching the content file entity information items, using attribute information items on the pre-shared content files and the shared content files. Such narrowing down contributes to reducing the processing load for matching the content file entity information items (secondary matching) for identification of content files. This feature makes the processing load realistically acceptable for identifying the same content files, which allows the identification of shared content files aa and ad respectively with pre-shared content files 13 and 16 as the same content files.

FIG. 9 shows exemplary integrated content file information according to the embodiment. In the example shown in FIG. 9, the pre-shared content file information in FIG. 3 and the shared content file information in FIG. 4 are provided as integrated information. In the integrated information, content file IDs for uniquely identifying same content files, entity data items for the same content files (the column "Image and Video"), pre-shared additional information items, and shared additional information items are associatively managed with one another.

Described hereinafter are Examples showing specific examples of the details of the processing executed by the content control apparatus according to the embodiment as shown in FIGS. 6 and 7.

Example 1

For example, suppose a case where the pre-shared content file information obtaining unit 401 obtains pre-shared content file information including attribute information items on dates and times when pre-shared content files were obtained and stored, and the shared content file information obtaining unit 407 obtains shared content file information including attribute information items on dates and times when shared content files were obtained and stored. Here, the narrowing unit 405 matches, one another, attribute information items (primary matching) obtained by the pre-shared content file information storing unit 402 and the shared content file information storing unit 408, and indicating the dates and times of the pre-shared content files and the shared content files (hereinafter also referred to as content file). Then, the narrowing unit 405 narrows down content files as secondary matching targets, so that the narrowed-down content files in a pair are of the same capturing and storing date and time. The content file identifying unit 406 matches the shared content files and pre-shared content files narrowed down by the narrowing unit 405 using the content file entity information items (secondary matching), and successfully determines that a pre-shared content file and a shared content file identified to be partially or same are originally the same content files. In some cases, for example, the pre-shared content file information obtaining unit 401 obtains detailed attribute information items on dates and times (for example, by seconds) when pre-shared content files were obtained and stored, and the shared content file information obtaining unit 407 obtains coarse attribute information items on dates and times (for example, by minutes) when shared content files were obtained and stored. Here, the narrowing unit 405 may match content files one another (primary matching), using coarse attribute information items (by minutes in the above example) among attribute information items on dates and times.

Example 2

For example, suppose a case where the pre-shared content file information obtaining unit 401 obtains pre-shared content file information including attribute information items on places where pre-shared content files were obtained and stored, and the shared content file information obtaining unit 407 obtains shared content file information including attribute information items on places where shared content files were obtained and stored. Here, the narrowing unit 405 matches, one another, the attribute information items (primary matching) obtained by the pre-shared content file information storing unit 402 and the shared content file information storing unit 408 and each indicating the place where a content file shows. Then, the narrowing unit 405 narrows down content files as secondary matching targets, so that the narrowed-down content files in a pair are of the same capturing and storing place. The content file identifying unit 406 matches the shared content files and pre-shared content files narrowed down by the narrowing unit 405 using the content file entity information items (secondary matching), and successfully determines that a pre-shared content file and a shared content file identified to be partially or same are originally the same content files. In some cases, for example, the pre-shared content file information obtaining unit 401 obtains detailed attribute information items on places (for example, by up to seconds in latitude and longitude) when pre-shared content files were obtained and stored, and the shared content file information obtaining unit 407 obtains coarse attribute information items on dates and times (for example, by up to minutes in latitude and longitude) when shared content files were obtained and stored. Here, the narrowing unit 405 may match content files one another (primary matching), using coarse attribute information items (by minutes in the above example) among attribute information items on places.

Example 3

For example, suppose a case where the pre-shared content file information obtaining unit 401 obtains pre-shared content file information including attribute information items on appliances by which pre-shared content files were obtained and stored, and the shared content file information obtaining unit 407 obtains shared content file information including attribute information items on appliances by which shared content files were obtained and stored. Here, the narrowing unit 405 matches, one another, the attribute information items (primary matching) obtained by the pre-shared content file information storing unit 402 and the shared content file information storing unit 408 and each indicating an appliance. Then, the narrowing unit 405 narrows down content files as secondary matching targets, so that the narrowed-down content files in a pair are of the same capturing and storing appliance. The content file identifying unit 406 matches the shared content files and pre-shared content files narrowed down by the narrowing unit 405 using the content file entity information items (secondary matching), and successfully determines that a pre-shared content file and a shared content file identified to be partially or same are originally the same content files, in some cases, for example, the pre-shared content file information obtaining unit 401 obtains detailed attribute information items on appliances (for example, on product numbers and model numbers of appliances) by which pre-shared content files were obtained and stored, and the shared content file information obtaining unit 407 obtains coarse attribute information items on appliances (for example, on kinds of appliances such as cellular phone, tablet computer, and digital camera) by which shared content files were obtained and stored. Here, the narrowing unit 405 may match content files one another (primary matching), depending whether or not the detailed attribute information items on appliances belong to the coarse attribute information items on appliances.

Example 4

For example, suppose a case where the pre-shared content file information obtaining unit 401 obtains pre-shared content file information including attribute information items on dates and times when pre-shared content files were obtained and stored, and the shared content file information obtaining unit 407 obtains shared content file information including attribute information items on dates and times when shared content files were obtained and stored. Here, the narrowing unit 405 matches (primary matching) (i) attribute information items on the dates and times of each of pre-shared content files obtained by the pre-shared content file information storing unit 402 and (ii) attribute information items on the dates and times when shared content files obtained by the shared content file information storing unit 408 were shared. Then, the narrowing unit 405 narrows down, as secondary matching targets, pre-shared content files whose capturing and storing dates and times precede their sharing dates and times. The content file identifying unit 406 matches the shared content files and pre-shared content files narrowed down by the narrowing unit 405 using the content file entity information items (secondary matching), and successfully determines that a pre-shared content file and a shared content file identified to be partially or same are originally the same content files.

Example 5

For example, suppose a case where the pre-shared content file information obtaining unit 401 obtains pre-shared content file information including attribute information items on kinds of pre-shared content files, and the shared content file information obtaining unit 407 obtains shared content file information including attribute information items on kinds of shared content files. Here, the narrowing unit 405 matches, one another, the attribute information items (primary matching) obtained by the pre-shared content file information storing unit 402 and the shared content file information storing unit 408 and each indicating the kind of a content file. Then, the narrowing unit 405 narrows down content files as secondary matching targets, so that the narrowed-down content files in a pair are of the same kind. The content file identifying unit 406 matches the shared content files and pre-shared content files narrowed down by the narrowing unit 405 using the content file entity information items (secondary matching), and successfully determines that a pre-shared content file and a shared content file identified to be partially or same are originally the same content files.

Example 6

For example, suppose a case where the pre-shared content file information obtaining unit 401 obtains pre-shared content file information including attribute information items on sizes of pre-shared content files, and the shared content file information obtaining unit 407 obtains shared content file information including attribute information items on sizes of shared content files. Here, the narrowing unit 405 matches, one another the attribute information items (primary matching) obtained by the pre-shared content file information storing unit 402 and the shared content file information storing unit 408 and each indicating the size of a content file. Then, the narrowing unit 405 narrows down content files as secondary matching targets, so that the narrowed-down content files in a pair are of the same size. The content file identifying unit 406 matches the shared content files and pre-shared content files narrowed down by the narrowing unit 405 using the content file entity information items (secondary matching), and successfully determines that a pre-shared content file and a shared content file identified to be partially or same are originally the same content files. In some cases, for example, the user uses a sharing website which specifies the maximum sizes of content files for sharing and resizes a content file into the maximum size for sharing when the content file is larger than the maximum size in content-file sharing. Here, for shared content files whose file sizes are smaller than the maximum size for sharing, the narrowing unit 405 may narrow down content files, so that the narrowed-down content files (secondary matching targets) in a pair are of the same in file size. Furthermore, in addition, for shared content files whose file sizes are the maximum size for sharing, the narrowing unit 405 may narrow down content files, so that the narrowed-down content files (secondary matching targets) in a pair are larger in size than the shared content files.

Example 7

For example, suppose a case where the pre-shared content file information obtaining unit 401 obtains pre-shared content file information including attribute information items on tags of pre-shared content files, and the shared content file information obtaining unit 407 obtains shared content file information including attribute information items on tags of shared content files. Here, the narrowing unit 405 matches, one another, the attribute information items (primary matching) obtained by the pre-shared content file information storing unit 402 and the shared content file information storing unit 408 and each indicating a tag attached to a content file. Then, the narrowing unit 405 narrows down content files as secondary matching targets, so that the narrowed-down content files in a pair have the same attribute information item on the tags. The content file identifying unit 406 matches the shared content files and pre-shared content files narrowed down by the narrowing unit 405, using the content file entity information items (secondary matching). Such matching allows the content file identifying unit 406 to determine that a pre-shared content file and a shared content file identified to be partially or same are originally the same content files.

It is noted that the when the attribute information items on tags for matching (primary matching) are hierarchically or inclusively related with each other in terms of a concept classification, the narrowing unit 405 may narrow down content files, so that the narrowed-down content files as matching targets (secondary matching targets) in a pair have the attribute information items. Here, the tags are attribute information items on people, objects, places and scenes. An attribute information item may be directly assigned by the user, by the analysis result of a content file using a recognition technology, and by the analysis result of a comment assigned to a shared content file. Moreover, the hierarchical or inclusive relationship among the tags in terms of a concept classification can be found out through extraction of words included in the tags and comparison of the extracted words with a dictionary database which defines a concept classification.

Example 8

Suppose content files are images. In addition, suppose a case where the pre-shared content file information obtaining unit 401 and the shared content file information obtaining unit 407 respectively obtain pre-shared content file information and shared content file information including attribute information items on the horizontal-to-vertical ratios in image size. Here, the narrowing unit 405 matches, one another, the attribute information items (primary matching) obtained by the pre-shared content file information storing unit 402 and the shared content file information storing unit 408 and indicating the horizontal-to-vertical ratios in image size. Then, the narrowing unit 405 narrows down content files as secondary matching targets, so that the narrowed-down content files in a pair are of the same horizontal to vertical ratio in image size. The content file identifying unit 406 matches the shared content files and pre-shared content files narrowed down by the narrowing unit 405, using the content file entity information items (secondary matching). Such matching allows the content file identifying unit 406 to determine that a pre-shared content file and a shared content file identified to be partially or same are originally the same content files.

Example 9

Suppose a case where the pre-shared content file information obtaining unit 401 obtains (shares) pre-shared content file information including attribute information items on applications used by the terminal 10 for obtaining pre-shared content files and the shared content file information obtaining unit 407 obtains shared content file information including attribute information items on applications used by the shared content file information obtaining unit 407 for sharing shared content files. Here, the narrowing unit 405 matches, one another, the attribute information items (primary matching) obtained by the pre-shared content file information storing unit 402 and the shared content file information storing unit 408 and indicating the used applications. Then, the narrowing unit 405 narrows down content files as secondary matching targets, so that the attribute information items in the narrowed-down content files in a pair indicate the same used application. The content file identifying unit 406 matches the shared content files and pre-shared content files narrowed down by the narrowing unit 405, using the content file entity information items (secondary matching). Such matching allows the content file identifying unit 406 to determine that a pre-shared content file and a shared content file identified to be partially or same are originally the same content files. In some cases, for example, the pre-shared content file information obtaining unit 401 obtains detailed attribute information items on an application (such as the name of the application) used when a pre-shared content file is obtained (shared), and the shared content file information obtaining unit 407 obtains coarse attribute information items on an application (such as the kind of an application) used when a shared content file is shared. Here, the narrowing unit 405 may match content files (primary matching), depending whether or not the detailed attribute information items on applications belong to the coarse attribute information items on applications.

Example 10

Suppose a case where the pre-shared content file information obtaining unit 401 and shared content file information obtaining unit 407 respectively obtains pre-shared content file information and shared content file information. Both the information sets include attribute information items either on appliances by which content files are obtained and stored or on applications used when content files are shared. Here, the narrowing unit 405 (i) matches (primary matching) the attribute information items obtained by the pre-shared content file information storing unit 402, and indicating the appliances or (ii) matches the attribute information items obtained by the shared content file information storing unit 408, and indicating the used applications. Then, the narrowing unit 405 narrows down content files as secondary matching targets, so that the narrowed-down content files in a pair show the same appliance (i) in which an application used when the content files were shared is installed or (ii) by which the content files were obtained and stored. The content file identifying unit 406 matches the shared content files and pre-shared content files narrowed down by the narrowing unit 405 using the content file entity information items (secondary matching). Such matching allows the content file identifying unit 406 to determine that a pre-shared content file and a shared content file identified to be partially or same are originally the same content files.

Example 11

For example, suppose a case where pre-shared content file information obtaining unit 401 obtains pre-shared content file information including attribute information items on file formats of pre-shared content files, and the shared content file information obtaining unit 407 obtains shared content file information including attribute information items on file formats of shared content files. Here, the narrowing unit 405 matches, one another, the attribute information items (primary matching) obtained by the pre-shared content file information storing unit 402 and the shared content file information storing unit 408, and indicating the file formats. Then, the narrowing unit 405 narrows down content files as secondary matching targets, so that the narrowed-down content files in a pair are of the same file format. The content file identifying unit 406 matches the shared content files and pre-shared content files narrowed down by the narrowing unit 405, using the content file entity information items (secondary matching). Such matching allows the content file identifying unit 406 to determine that a pre-shared content file and a shared content file identified to be partially or same are originally the same content files.

It is noted that specific details of the processing shall not be limited to the ones described in Examples 1 to 11.

According to the above-described embodiment, a pre-shared content file and a shared content file which are partially or same can be identified by (i) narrowing down pre-shared content files to be candidates for matching targets (secondary matching target), using attribute information items on content files before and after sharing, and (ii) matching (secondary matching) shared content files and the narrowed-down pre-shared content files based on content file entity information items. Such features make it possible to efficiently and accurately identify content files, as well as to reduce processing load caused when content files are identified. As a result, content file information sets before and after sharing can be consolidated.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

It is noted that, in the above embodiment, each of the constituent elements may be implemented in a form of dedicated hardware. The constituent elements may also be implemented through execution of a software program suitable to for each constituent element. Each of the constituent elements may be implemented as a program executing unit, such as a CPU and a processor, which reads out and executes a software program recorded on a recording medium including a hard disc or a semiconductor memory. Here, the program below may be the software that works as the categorizing apparatus according to the embodiment.

In other words, the program causes a computer to execute: obtaining first content file information including attribute information items each on one of first content files (i) which belong to a first content file group and (ii) each of which have an identifier assigned by a first rule; obtaining second content file information including attribute information items each on one of second content files (i) which belong to a second content file group and (ii) each of which have an identifier assigned by a second rule which is different from the first rule; narrowing down the first content files, the narrowed-down first content files working as matching targets and each having an attribute information item satisfying a condition which is set based on the first content file information and the second content file information; and identifying, respectively from among the narrowed-down first content files and the second content files, a first content file and a second content file which are partially or entirely same by matching entity information items each on one of the second content files and entity information items each on one of the narrowed-down first content files as the matching targets.

Moreover, for example, narrowing scheme specifying unit 404 may obtain, from a sharing website set by the matching target sharing website setting unit 403, information other than a managing technique, and based on the obtained information, design (specify) a narrowing scheme (primary managing scheme). Here, for example, the pre-shared content file information obtained by the pre-shared content file information obtaining unit 401 and the shared content file information obtained by the shared content file information obtaining unit 407 may be referred to, and a narrowing scheme (primary matching scheme) may be designed (specified) based on information obtained in common between the pre-shared content file information and the shared content file information. Such features make it possible to design (specify), for a new sharing website, a narrowing scheme depending on the new sharing website. Described hereinafter is a specific example of the features.

For example, in order to specify a narrowing scheme (primary matching scheme), the narrowing scheme specifying unit 404 may hold definition information such as "the date when the pre-shared content file was obtained or stored is on or before the shared content was shared" and "the pre-shared content file and the shared content file are the same in file size if the file size of the shared content file is smaller than the maximum size for sharing specified for the sharing website, and the file size of the pre-shared content file is greater than or equal to the maximum size for sharing if the file size of the shared content file is of the maximum size for sharing specified for the sharing website". Then, if an attribute information item on dates and times is obtained from the pre-shared content file information and the shared content file information, the specified narrowing scheme may be "the date when the pre-shared content file was obtained or stored is on or before the shared content was shared". If an attribute information item on file sizes is obtained from the pre-shared content file information and the shared content file information, the specified narrowing scheme may be "the pre-shared content file and the shared content file are the same in file size if the file size of the shared content file is smaller than the maximum size for sharing specified for the sharing website, and the file size of the pre-shared content file is greater than or equal to the maximum size for sharing if the file size of the shared content file is of the maximum size for sharing specified for the sharing website".

It is noted that multiple narrowing schemes (primary matching schemes) may be specified by the narrowing scheme specifying unit 404. When both the attribute information item on dates and time and the attribute information item on file sizes can be obtained from the pre-shared content file information and the shared content file information in the above example, for example, specified narrowing schemes (primary matching schemes) may be "the date when the pre-shared content file was obtained or stored is on or before the shared content was shared", and "the pre-shared content file and the shared content file are the same in file size if the file size of the shared content file is smaller than the maximum size for sharing specified for the sharing website, and the file size of the pre-shared content file is greater than or equal to the maximum size for sharing if the file size of the shared content file is of the maximum size for sharing specified for the sharing website".

The above embodiment shows an exemplary case where the shared content files are the referring source and the pre-shared content files are the referring target. The content files to be the referring source and the content files to be the referring target, however, shall not be limited to the exemplary case. The content control method may be implemented with a group of content files designated as the referring source and another group of content files designated as the referring target. For example, the referring source may be a group of content files selected from shared content files stored in a sharing website, and stored in another terminal. The referring target may be shared content files stored in the sharing website.

In the above embodiment, the pre-shared content files are narrowed down and matched (secondary matching) with shared content files; however, the narrowing and matching shall not be limited to this. The shared content files may be narrowed down and matched (secondary matching) with the pre-shared content files.

In the above embodiment, the content-file sharing server 20 is described as a server for providing an SNS and a sharing website; however, the content-file sharing server 20 shall not be limited to this. When a part of pre-shared content files (first content files) are stored (including sharing and duplicating) as shared content files (second content files), the content-file sharing server 20 may be a service to change an identifier for uniquely identifying a content file, such as a file name and an ID. In other words, the content-file sharing server 20 may be a service which masks whether or not the identification of a content file is impossible unless entity information items are matched.

In the embodiment, the first content file group includes multiple first content files; however, the first content file group shall not be limited to this. The first content file group may include one first content file since the user deletes some of the first content files. This case is also included in the scope of the present invention. Similarly, the second content file group includes multiple second content files; however, the second content file group shall not be limited to this. The second content file group may include one second content file. This case is also included in the scope of the present invention.

A part or all of the constituent elements constituting the content control apparatus according the embodiment may be configured from a single System-LSI (Large-Scale Integration).

The System-LSI is a super-multi-function LSI manufactured by integrating constituent units on one chip. Specifically, the System-LSI is a computer system including a microprocessor, a Read Only Memory (ROM), a Random Access Memory (RAM), or by means of a similar device. The ROM stores a computer program. The System-LSI performs its functions through the microprocessor's operation according to the computer program.

Furthermore, here, System-LSI is mentioned but there are instances where, due to a difference in the degree of integration, the designations IC, LSI, super LSI, and ultra LSI are used. Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if an integrated circuit technology that replaces the LSI appears thorough the progress in the semiconductor technology or another derived technology, that technology can naturally be used to carry out integration of the constituent elements. Biotechnology can be applied to the integrated circuit technology.

Moreover, the present invention may be implemented in the form of a content control method including processing units in the above described minimal structural unit 40A as steps, as well as in the form of the content control apparatus including the minimal structural unit 40A.

INDUSTRIAL APPLICABILITY

The present invention is applicable to content control methods, content control apparatuses, and programs. In particular, the present invention can be used as a content control method, a content control apparatus, and a program to implement a function and a service for identifying content files obtained and stored by a user with shared content files included in the obtained and stored content files, and for consolidating content file information.

REFERENCE SIGNS LIST

10 Terminal
20 Content-file sharing server
30 Network
40 Content control apparatus
40A Minimal structural unit
401 Pre-shared content file information obtaining unit

402 Pre-shared content file information storage unit
403 Matching target sharing website setting unit
404 Narrowing scheme specifying unit
405 Narrowing unit
406 Content file identifying unit
407 Shared content file information obtaining unit
408 Shared content file information storage unit
409 Consolidating unit

The invention claimed is:

1. A content control method capable of identifying content files based on content information, the content control method comprising:

obtaining, from a terminal, first content file information including first attribute information items on first content files (i) which belong to a first content file group and (ii) each of which have a first identifier assigned by a first rule;

obtaining, from a sharing server that provides for managing a social networking service (SNS) and a sharing web site, second content file information including second attribute information items on second content files (i) which belong to a second content file group and (ii) each of which have a second identifier assigned by a second rule which is different from the first rule;

storing the second content file information;

specifying at least one narrowing scheme, from a plurality of narrowing schemes, based on the sharing website;

narrowing down, based on the at least one narrowing scheme specified in the specifying, the first content files, the narrowed-down first content files working as matching targets and each having an attribute information item included in the first attribute information items satisfying a condition which is set based on the first content file information and the second content file information;

identifying, respectively from among the narrowed-down first content files and the second content files, a first narrowed-down first content file and a first second content file which are partially or entirely identical by matching second entity information items on the first second content file and first entity information items on the first narrowed-down first content file as the matching targets; and determining, based on the matching, that the first narrowed-down first content file and the first second content file are the same content files, wherein the first content files are original content files that have not been stored on the sharing server, and the second content files are shared copies of the original content files that have been changed from the original content files and stored on the sharing server.

2. The content control method according to claim 1, further comprising:

associatively consolidating a first content file information item included in the first content file information and a second content file information item included in the second content file information with each other, the first content file information item and the second content file information item being respectively on the first narrowed-down first content file and the first second content file identified in the identifying as partially or entirely identical.

3. The content control method according to claim 1, wherein the second content file group includes a first content file (i) included in one or more of the first content files belonging to the first content file group and (ii) stored as one of the second content files, and the first content file stored as the one second content file has the second identifier assigned by the second rule instead of the first identifier assigned by the first rule.

4. The content control method according to claim 1, wherein the second content file group includes a first content file (i) included in one or more of the first content files belonging to the first content file group and (ii) shared as one of the second content files, and in the second content file group, the first content file shared as the one second content file is managed with the second identifier assigned by the second rule instead of the first identifier assigned by the first rule.

5. The content control method according to claim 1, wherein the sharing website includes a content-file managing website, and the second content file group is managed on the content-file managing website, the content control method further comprising:

specifying, from among the first attribute information items included in the first content file information, one attribute information item to be used for the narrowing down, the specifying being based on a content-file managing scheme specified on and obtained from the content-file managing website, and wherein the narrowing down includes the setting of the condition based on the first content file information, the second content file information, and the one attribute information item specified in the specifying.

6. The content control method according to claim 1, wherein the first content files and the second content files are one of image files, video files, audio files, and music files.

7. The content control method according to claim 1, wherein the first attribute information items in the first content file information include at least one of:

information on dates and times when the first content files were obtained or stored; information on places where the first content files were obtained or stored; information on terminals by or in which the first content files were obtained or stored; information on sizes of the first content files; information on tags of the first content files; information on applications used when the first content files were shared; and information on file formats of the first content files.

8. The content control method according to claim 1, wherein the second attribute information items in the second content file information include at least one of:

information on dates and times when the second content files were obtained or stored, or when the second content files belonged to the second content file group; information on places including places where the second content files were stored; information on terminals by or in which the second content files were obtained or stored, or which caused the second content files to belong to the second content file group; information on sizes of the second content files; information on tags of the second content files; information on applications used when the second content files belonged to the second content file group; and information on file formats of the second content files.

9. The content control method according to claim 1, wherein the first content files include images, and each of the first attribute information items in the first content file information includes one of: information on a size and an aspect ratio of each of the images in the first content files; and information on a ratio of a resolution for each of the images in the first content files.

10. The content control method according to claim 9, wherein the second content files include images, and each of the second attribute information items in the second content file information includes one of: information on a size and an aspect ratio of each of the images in the second content files; and information on a ratio of a resolution for each of the images in the second content files.

11. The content control method according to claim 1, wherein each of the second attribute information items in the second content file information includes:

(i) one of a comment, an evaluation, and a tag assigned to each of the second content files by a user, or (ii) information indicating a result of a text analysis on the comment, the evaluation, or the tag.

12. The content control method according to claim 1, wherein the first entity information items include amounts of first characteristics extracted from the first content files, the second entity information items include amounts of second characteristics extracted from the second content files, and the first content files and the second content files are one of image files, video files, audio files, and music files.

13. The content control method according to claim 12, wherein each of (i) the amounts of first characteristics and (ii) the amounts of second characteristics includes at least one of: color information and luminance information of pixels forming the image files; frequencies of the audio files and the music files; and amplitudes of the audio files and the music files.

14. The content control method according to claim 1, wherein information of the first attribute information items is partially or entirely changed, the changed information of the first attribute information items is included as information in the second attribute information items, and in the storing of the second content file information, the second attribute information items including the changed information of the first attribute information items are stored, such that the second content files are uniquely identifiable from the first content files based on a comparison between the information of the first attribute items and the changed information of the first attribute items.

15. The content control method according to claim 1, wherein the first identifiers are partially or entirely changed, and in the storing of the second content file information, the changed first identifiers are stored and assigned to the second content files so that the second content files are uniquely identifiable from the first content files, based on the changed first identifiers.

16. The content control method according to claim 1, wherein the second rule is assigned by the SNS managed by the sharing server.

17. The content control method according to claim 1, wherein the sharing website includes a plurality of sharing websites, and the content control method further comprises:

managing rule information on the narrowing scheme specified in the specifying for each sharing website of the plurality of sharing websites.

18. A content control apparatus capable of identifying content files based on content information, the content control apparatus comprising:

a hardware processor; and a non-transitory computer-readable recording medium, having stored thereon executable instructions, which when executed by the hardware processor, cause the content control apparatus to function as:

a first content file information obtaining unit configured to obtain, from a terminal, first content file information including first attribute information items on first content files (i) which belong to a first content file group and (ii) each of which have a first identifier assigned by a first rule;

a second content file information obtaining unit configured to obtain, from a sharing server that provides for managing a social networking service (SNS) and a sharing website, second content file information including second attribute information items on second content files (i) which belong to a second content file group and (ii) each of which have a second identifier assigned by a second rule which is different from the first rule;

a second content file information storage unit configured to store the second content file information;

a narrowing scheme specifying unit configured to specify at least one narrowing scheme, from a plurality of narrowing schemes, based on the sharing website;

a narrowing unit configured to narrow down, based on the at least one narrowing scheme specified by the narrowing scheme specifying unit, the first content files, the narrowed-down first content files working as matching targets and each having an attribute information item included in the first attribute information items satisfying a condition which is set based on the first content file information and the second content file information; and a content file identifying unit configured to:

identify, respectively from among the narrowed-down first content files and the second content files, a first narrowed-down first content file and a first second content file which are partially or entirely identical by matching second entity information items on the second content file and first entity information items on the first narrowed-down first content file as the matching targets; and determine, based on the matching, that the first narrowed-down first content file and the first second content file are the same content files, wherein the first content files are original content files that have not been stored on the sharing server, and the second content files are shared copies of the original content files that have been changed from the original content files and stored on the sharing server.

19. A non-transitory computer-readable recording medium for use in a computer, the recording medium having a computer program, capable of identifying content files based on content information, recorded thereon for causing the computer to execute:

obtaining, from a terminal, first content file information including first attribute information items on first content files (i) which belong to a first content file group and (ii) each of which have a first identifier assigned by a first rule;

obtaining, from a sharing server that provides for managing a social networking service (SNS) and a sharing web site, second content file information including second attribute information items on second content files (i) which belong to a second content file group and (ii) each of which have a second identifier assigned by a second rule which is different from the first rule;

storing the second content file information;

specifying at least one narrowing scheme, from a plurality of narrowing schemes, based on the sharing website;

narrowing down, based on the at least one narrowing scheme specified in the specifying, the first content files, the narrowed-down first content files working as matching targets and each having an attribute information item included in the first attribute information items satisfying a condition which is set based on the first content file information and the second content file information;

identifying, respectively from among the narrowed-down first content files and the second content files, a first narrowed-down first content file and a first second content file which are partially or entirely identical by matching second entity information items on the second content file and first entity information items on the first narrowed-down first content file as the matching targets; and determining, based on the matching, that the first narrowed-down first content file and the first second content file are the same content files, wherein the first content files are original content files that have not been stored on the sharing server, and the second content files are shared copies of the original content files that have been changed from the original content files and stored on the sharing server.

* * * * *